United States Patent [19]

Cunningham et al.

[11] 4,190,360

[45] Feb. 26, 1980

[54] VACUUM CONTACT REPRODUCTION APPARATUS

[75] Inventors: Bruce B. Cunningham, Alexandria, Va.; Charles R. Barfield, Jr., Orlando, Fla.

[73] Assignee: Lanman Lithotech, Inc., Orlando, Fla.

[21] Appl. No.: 13,190

[22] Filed: Feb. 16, 1979

[51] Int. Cl.$^2$ .............................................. G03B 27/04
[52] U.S. Cl. ......................................... 355/89; 355/93
[58] Field of Search ....................... 355/87, 89, 91, 93, 355/114, 94

[56] References Cited

U.S. PATENT DOCUMENTS

| | | | |
|---|---|---|---|
| 2,916,982 | 12/1959 | Caine et al. | 355/89 |
| 3,313,225 | 4/1967 | Mears | 355/89 |
| 3,409,363 | 11/1968 | Matthaes | 355/89 X |
| 3,689,153 | 9/1972 | Suzuki | 355/89 |

Primary Examiner—Richard A. Wintercorn
Attorney, Agent, or Firm—J. Gibson Semmes

[57] ABSTRACT

A contact reproduction apparatus for duplicating images formed upon a transparency onto a photosensitive material, including plural vacuum contact printers, the respective evacuation chambers of which are connected, in parallel manner, to a master vacuum holding tank, the interior of which is maintained at an extremely high state of evacuation by a high displacement vacuum pump capable of drawing a maximum end vacuum in excess of 29 inches of mercury. An extremely high evacuation potential is provided at each evacuation chamber by making the volume of the master holding tank significantly larger than the combined volumes of the respective evacuation chambers. When a desired reproduction is to be made at one or more of the printers, activation of an automatic vacuum control provided with each such unit applies this high evacuation potential to the respective evacuation chamber, rapidly evacuating the same and rapidly drawing the copy sheet and photosensitive material into intimate contact without the formation of distortional anomalies therebetween. Under automatic control provided at each printer, the photosensitive material is exposed while drawn into intimate contact with the transparency.

5 Claims, 5 Drawing Figures

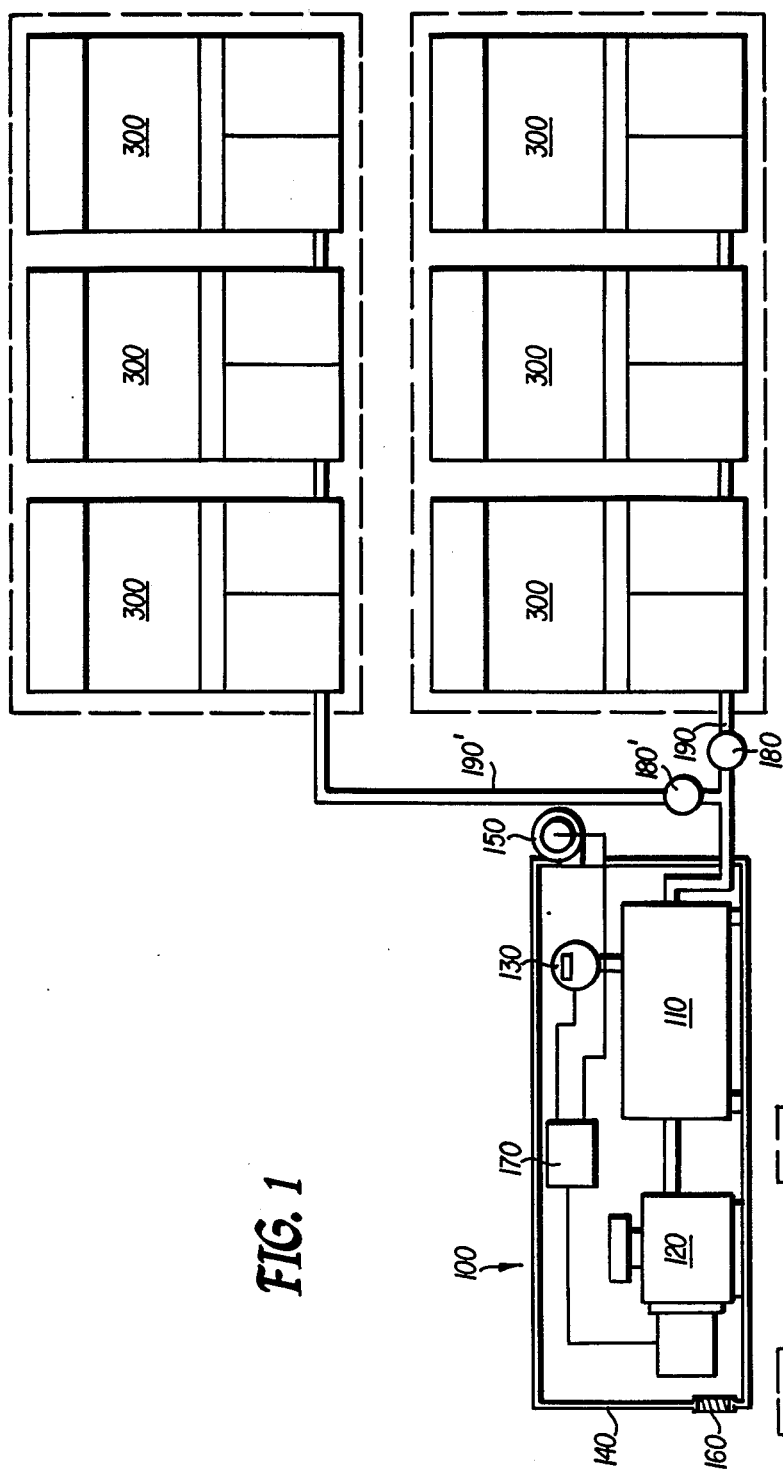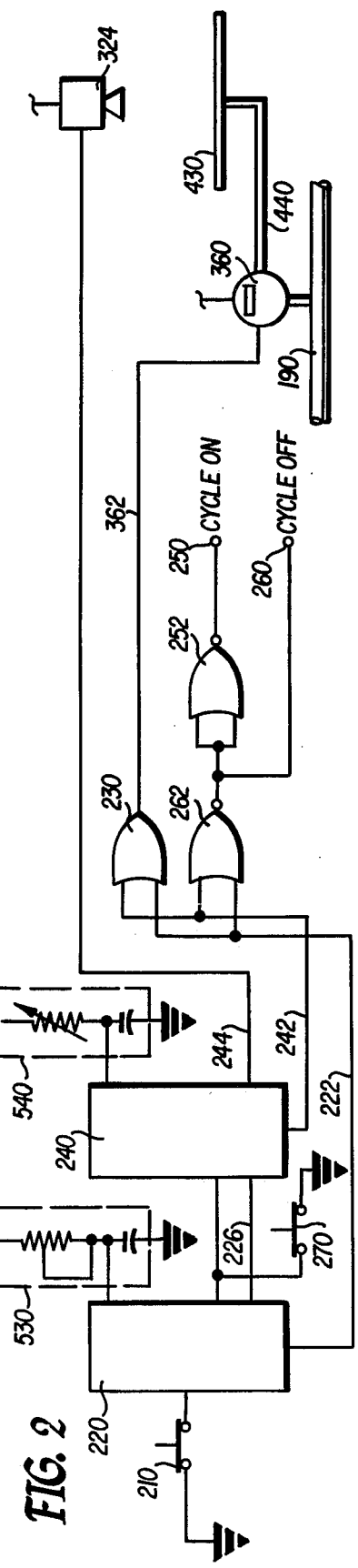
FIG. 1
FIG. 2

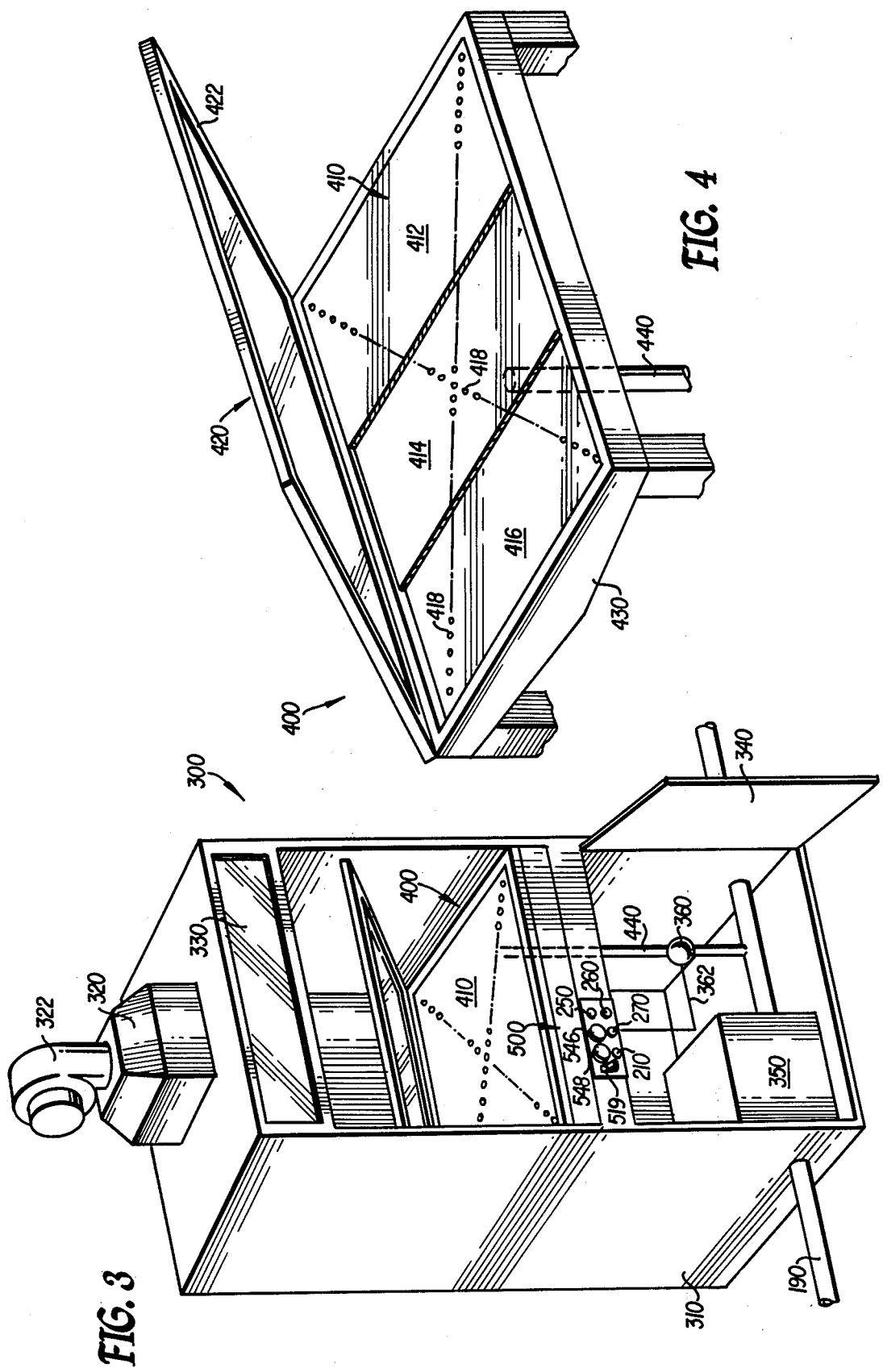

VACUUM CONTACT REPRODUCTION APPARATUS

BACKGROUND OF THE INVENTION

This invention broadly relates to apparatus for vacuum contact reproduction. In particular the invention relates to such an apparatus wherein an extremely high evacuation potential, provided by a unique master vacuum system, is selectively applied to the respective evacuation chambers of plural vacuum contact printers to minimize the time required to effect intimate, non-distortional, contact between a photosensitive material and a transparency to be reproduced thereon. Included in the invention are automatic vacuum and exposure controls for independently controlling selective reproduction at each of the vacuum contact printers.

In contact reproduction, to produce high resolution, it is imperative that a transparency to be duplicated be securely drawn into, and maintained in, close contact with the sensitized material for exposure. Currently, the most commonly used device, the so-called vacuum contact printer, employs a vacuum frame in which the drawing of a vacuum forces the transparency into very close contact with the photosensitive material.

Other known devices utilize mechanical means to mechanically urge the materials into contact. Still other devices achieve close contact by employing mechanical means in combination with vacuum means.

While apparatus which is representative of these latter two types of prior art devices are effective, particularly when used in integrated circuit manufacture, they necessarily include complex mechanisms and associated complex controls which are not only costly to manufacture, but susceptible to operational fatigue and malfunction. Such devices are also not well adapted to versatile usage, particularly when the dimensions of the work pieces vary between successive operations.

The above mentioned prior art vacuum frames generally include a rubber blanket, which is disposed upon a support surface, a transparent cover, pivotally connected to the support surface for sealed engagement therewith, and a vacuum pump. In operation, the cover is disengaged, the transparency and photosensitive material are inserted, the cover is then closed, and the vacuum pump is activated, drawing the transparency and photosensitive material into close contact between the cover and rubber blanket.

Distinct operational disadvantages have been encountered when practicing duplication with such vacuum frames. Since the vacuum must be released to permit retrieval of the exposed work piece, each successive operation necessitates redrawing a vacuum from atmospheric pressure. Typically, the time required for the vacuum pump to draw a vacuum sufficient to closely contact the transparency and photosensitive material, the so-called draw-down, is on the order of several minutes. Since, for high resolution reproduction, it is imperative that exposure occur only while the photosensitive material transparency are in close contact, complete draw-down must be achieved prior to activating the exposure mechanism.

The known method of assuring complete draw-down requires the operator to make a visual scan, through the cover element of the vacuum frame, to detect the presence of air pockets or other distortion producing irregularities between the sensitized material and the transparency. This procedure requires, not only that the operator possess a high degree of skill in detecting the presence of such anomalies, but also, that he necessarily estimate the time required for complete draw-down. If the operator does not possess the requisite skill, or is inattentive during the several minutes required for draw-down, significant production time may be wasted. In practicing the prior art devices which employ this method, it is not uncommon for the entire process of draw-down and visual scan to take between five and ten minutes of operator time. Such time delays detrimentally affect overall production efficiency, especially where such delays are compounded in the production of a finished work-piece through multiple exposures, as, for example, in the production of composite printing films from color separated half-tone and line films.

Other prior art devices have reduced this problem by providing automatic control of the draw-down process, thus eliminating the guesswork involved in achieving the requisite state of evacuation. Such devices commonly employ a pressure responsive switch, which is associated with the vacuum pump, and which detects a predetermined level of low pressure in the vacuum frame and, thereupon, enables the exposure mechanism. While these systems have satisfactorily minimized direct operator involvement, they have not reduced the time period of several minutes that is required to achieve complete draw-down.

By contrast, the present invention not only eliminates direct operator assistance in determining complete draw-down but also significantly reduces the time required for such draw-down to approximately thirty (30) seconds or less. This is accomplished by providing a unique master vacuum system that is capable of applying an extremely high evacuation potential to the respective evacuation chambers of each of the plural vacuum contact printers. This evacuation potential is such as to guarentee that a fine end vacuum will be rapidly and uniformly developed within a given evacuation chamber during each successive operation. Because of such assurance of uniform and complete draw-down, the prior art needs for visual scanning and/or pressure responsive switching are totally obviated by the present invention. As well, the availability and predictability of such rapid draw-down allows the utilization of a simple control network operable upon time based parameters only. The control network, thus, is well adapted to construction from digital components. Such construction affords both reliability and manufacturing economy.

SUMMARY OF THE INVENTION

The present invention is an apparatus for vacuum contact duplication of a master transparency onto a photosensitive material. The invention includes plural vacuum contact printers, the respective evacuation chambers of which are connected, in parallel manner, to a master vacuum holding tank. Associated with each vacuum contact printer is a source of exposing radiation. Responsive to a pressure control switch, which senses the pressure level within the vacuum holding tank, a high displacement vacuum pump is selectively activated to evacuate the interior of the vacuum holding tank to form a source of fine vacuum. Also included are vacuum coupling means for selectively connecting the respective evacuation chambers to the source of fine vacuum to form a temporary fine vacuum in the respective evacuation chambers whereby the transparency and photosensitive material are rapidly drawn into intimate contact. Included further, are exposure control means for selectively activating the respective sources of exposing radiation while the transparency and photosensitive material are drawn into intimate contact.

The volume of the master holding tank is made significantly larger than the combined volumes of the respective evacuation chambers to assure that an extremely high evacuation potential is applied to the respective evacuation chambers in order to rapidly exhaust the air therefrom. The application of this evacuation potential significantly reduces the time required to draw the transparency and photosensitive material into intimate contact for non-distortional reproduction.

A preferred embodiment of the invention, automatic vacuum and exposure control means, adapted to time based operation only, are provided for independently controlling selectively reproduction at each of the plural vacuum contact printers.

It is an object of this invention to provide a contact reproduction apparatus in which a single master vacuum system, comprising a vacuum holding tank, a high displacement vacuum pump and a pressure control switch, forms a source of fine vacuum for evacuation of the respective evacuation chambers of the plural vacuum contact printers.

It is a further object of this invention to provide a contact reproduction apparatus having an improved source of vacuum which significantly reduces the time required to closely draw a photosensitive material into intimate contact with a transparency to be duplicated thereon.

Yet another object of this invention is to provide a contact reproduction apparatus which insures that complete draw-down will be uniformly provided during each duplicating cycle, thus eliminating the need for visual scanning or other direct operator involvement in the evacuation process.

The above and other objects and advantages of the present invention will become apparent from the following detailed description of a preferred embodiment thereof in which reference is made to the accompanying drawings.

BRIEF DESCRIPTION OF THE DRAWINGS

FIG. 1 is a schematic of the preferred embodiment of the invention showing master vacuum system and plural vacuum contact printers.

FIG. 2 is a schematic of the vacuum and exposure system of each of the printers of FIG. 1.

FIG. 3 is a view in perspective of one of the printers of FIG. 1.

FIG. 4 is an enlarged view in perspective of the vacuum frame assembly of FIG. 3, showing the blanket in partial section.

DESCRIPTION OF THE PREFERRED EMBODIMENT

Figure 5:
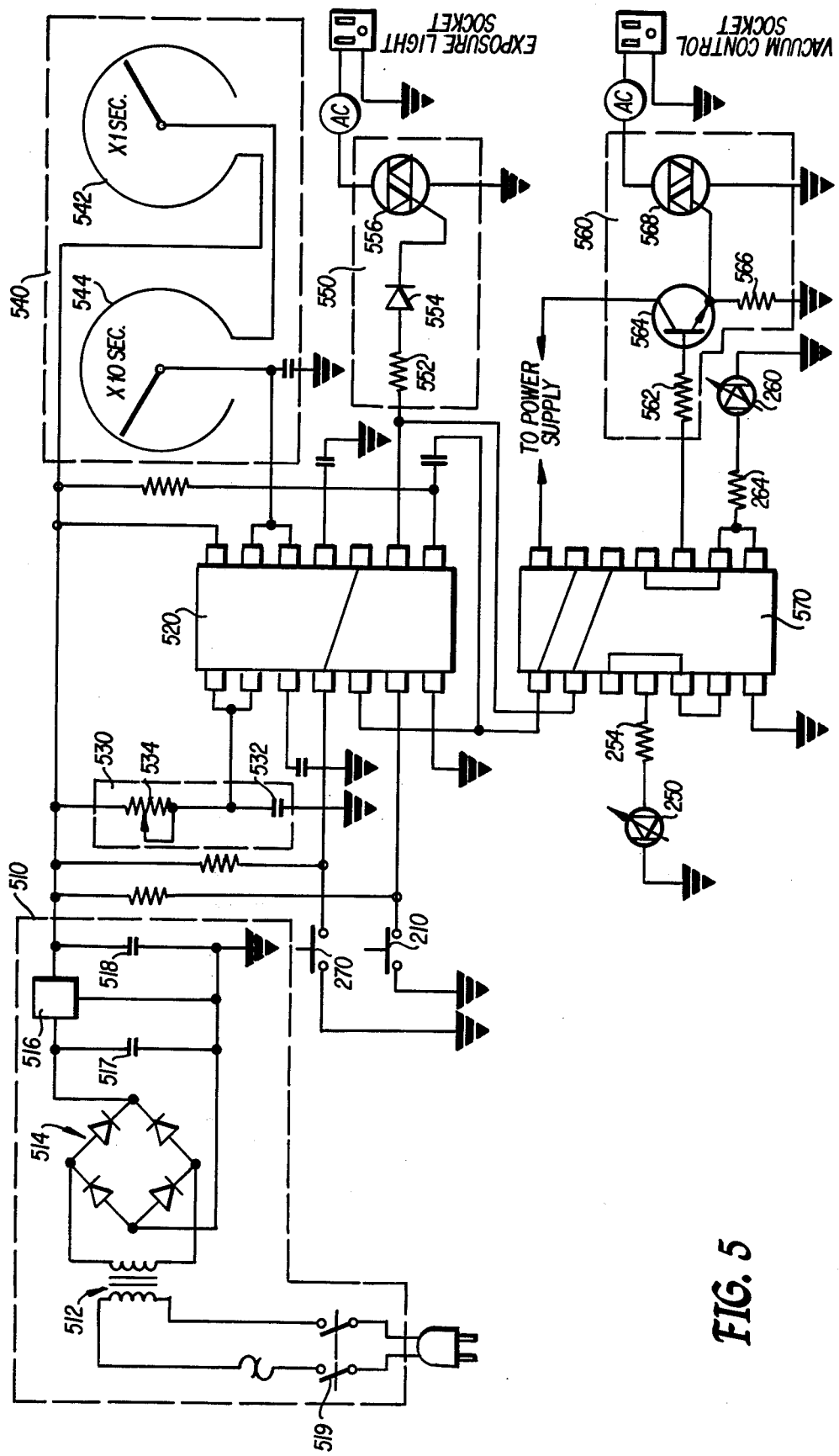
FIG. 5 is a schematic wiring diagram of the vacuum and exposure control circuit.

FIG. 1 schematically illustrates parallel connection of the respective plural vacuum contact printers 300 to master vacuum system 100. As will be fully discussed hereinafter with reference to FIG. 3, the preferred embodiment of the invention includes independent controls at each of the plural vacuum contact printers 300 for selectively connecting the respective evacuation chambers thereof to the master vacuum system 100 and for controlling the activation of the respective sources of exposing radiation.

Referring again to FIG. 1, the functional components of the master vacuum system 100 include a vacuum holding tank 110, a vacuum pump 120, and a pressure control switch 130. A cabinet 140 is provided for housing these components. Although not here shown, cabinet 140 is provided with plural doors to permit facile access to the components of the master vacuum system. To reduce noise in the production area occasioned by vacuum pump 120, cabinet 140 is soundproofed with suitable material, such as air conditioning duct material. When so equipped, the cabinet-master vacuum system assembly may be located in close proximity to the printers 300 with minimal effect upon the noise level in the production area. When so positioned, the top surface of the cabinet 140 provides, as well, additional work area for the operators. Cooling ventilation for vacuum pump 120 is provided by blower fan 150 through exhaust vent 160. For ample ventilation, displacement of blower fan 150 is preferably 265 cubic feet per minute. Power box 170 contains a manual system power switch and electrical interconnections for energizing blower fan 150 and pressure control switch 130. Also included in power box 170 is a power relay which is selectively enabled by pressure control switch 130 to selectively activate vacuum pump 120.

As schematically represented by phantom lines in FIG. 1, multiple banks of the printers 300 may be remotely located from the master vacuum system 100 and from each other. This is particularly advantageous when simultaneously conducted operations involve materials sensitive to different wavelengths of light. For example, one bank of printers may be located in a dark room for duplication using orthochromatic or panchromatic film, while a separate bank may be remotely located in a subdued lighting environment for duplication onto the new ultraviolet sensitive family of films. Valves 180 and 180' are provided in vacuum ducts 190 and 190', respectively, for terminating connection of one of the banks of printers when not in use. Although not preferred because of economic considerations, the invention is easily adapted to include plural master vacuum systems arrayed in parallel fashion. In such instance, suitable valves and conduits could be arranged so that the plural vacuum systems function either as a single integrated source of vacuum, or as alternative backup systems for each other.

As shown in FIG. 4, the vacuum frame assembly 400 of printer 300 includes a transparent cover 420 which is pivotally connected to the vacuum pan 430 for selective engagement and disengagement therewith. Vacuum pan 430 includes a flat support surface (not shown) upon which vacuum blanket 410 is removably disposed. Pneumatic seals 422 are provided around the perimeter of the lower surface of cover 420 so that, when cover 420 is engaged with vacuum pan 430, a sealed, exhaustible evacuation chamber is formed between cover 420 and the flat support surface of vacuum pan 430.

Vacuum blanket 410 is a thin three-layered flexible laminate of general rectangular configuration. A thin carrier sheet 416, of preferably clear polyester such as Mylar Registered U.S. Patent and Trademark Office is bonded to the underside of resilient core 414, which may be any suitable synthetic spongy material. A cloth cover 412, preferably a synthetic material such as Dacron Registered U.S. Patent and Trademark Office, is affixed to the upper surface of core 414. Plural perforations 418, vertically directed through vacuum blanket 410, communicate with vacuum line 440 and serve to equally distribute the evacuation potential developed during operation, as hereinafter described. It will be appreciated that the perforations 418 are adapted to various alternative embodiments. Symmetrical patterns, such as the preferred "X" patterns shown in FIGS. 3 and 4, have been found to be most effective.

FIG. 3 illustrates a preferred form of vacuum contact printer 300 employed in the invention. The printer 300 includes a free-standing exposure cabinet 310 which is of rigid construction to hold and support the various vacuum and exposure components, hereinafter described, in fixed relationship to the floor and to each other. As shown in FIG. 3, vacuum frame assembly 400 is contained with a recess of exposure cabinet 310 so that vacuum blanket 410 is disposed horizontally and at a convenient vertical distance above the floor to permit easy access into vacuum pan 430 for loading and unloading the work pieces. Exposure housing 320 is mounted on the top surface of exposure cabinet 310 and contains a suitable source of exposing radiation (not shown in FIG. 3) which is vertically directed through an opening (also not shown) in the exposure housing 320, towards the vacuum frame assembly 400. The exact positioning of the lamp relative to the vacuum blanket 410, while not of essence to the present invention, is in accordance with techniques well known in the art for obtaining high resolution reproduction. Cooling fan 322 is provided in exposure housing 320 to prevent overheating of the source of exposing radiation. Safe lights (not shown) are mounted on the upper interior of exposure housing 310 to aid the operator in registering the work pieces for duplication and in cleaning the transparent cover 420. A transparent safety panel 330 shields the operator's eyes from the bright exposing radiation while permitting easy viewing of the safe lights.

The lower portion of exposure cabinet 310, accessible through a normally closed door 340, contains a suitable power supply 350 for activating the source of exposing radiation. Also contained within the lower portion of the exposure cabinet is an electrically operable vacuum valve 360 which, in operation, effects the selective connection of vacuum line 440 through vacuum duct 190 to the master vacuum system 100. Vacuum valve 360 is selectively activated through conductor 362 by the vacuum control network, included within control box 500, the details of which will be fully discussed hereinafter with reference to FIG. 2.

Since a primary object of the present invention is to achieve complete draw down within a minimum period of time for each duplication cycle; this is accomplished by applying an extremely high evacuation potential to the respective evacuation chambers of the printers 300. It will be recalled that the evacuation chamber is defined as the volume formed between cover 420 and the flat support surface of vacuum pan 430, when cover 420 is in sealed engagement with vacuum pan 430. During a duplication cycle, it will be apparent that a photosensitive material, a transparency, and the vacuum blanket 410 will be contained within the evacuation chamber. To achieve complete drawdown, it is necessary to exhaust all of the air within the evacuation chamber so that atmospheric pressure forces the transparency and photosensitive material into close contact between cover 420 and vacuum blanket 410.

The application of an extremely high evacuation potential to rapidly exhaust air from the evacuation chamber is best understood by reference again to the master vacuum system 100 of FIG. 1. The essential components of the master vacuum system 100 are the vacuum holding tank 110, vacuum pump 120, and pressure control switch 130. These components are designed to form and continuously maintain a source of fine vacuum for selective application to the respective evacuation chambers. To assure complete, uniform drawdown during continuous, random, duplication cycles at the plural printers 300, the volume of the vacuum holding tank 110 must be significantly larger than the combined volumes of the respective evacuation chambers. Accordingly, it is preferred that the vacuum holding tank 110 have an internal volume of 60 gallons. To develop and maintain the requisite fine vacuum in the vacuum holding tank 110, a high displacement vacuum pump 120 must be employed. Predictable, uniform delivery of a fine vacuum has been achieved by employment of the preferred type 063, Busch R5 Super Series single state rotary vacuum pump, manufactured by Busch, Inc. of Virginia Beach, Va. This pump has a free air displacement of 41 cubic feet per minute and develops a guaranteed end vacuum of 29.9 inches of mercury.

Pressure control switch 130, preferably of the bourdon tube type, manufactured by the Mercoid Corporation of Chicago, Ill., responds to the pressure level in the vacuum holding tank 110 so as to selectively activate vacuum pump 120 to continuously maintain a fine vacuum of approximately 29.9 inches of mercury within the vacuum holding tank 110. When, at a given printer 300, vacuum valve 360 is open, the respective evacuation chamber is connected to this source of fine vacuum. Because the volume of vacuum holding tank 110 is significantly larger than the volume of the evacuation chamber, an extremely high evacuation potential is present. This evacuation potential rapidly exhausts the air from the evacuation chamber and develops a fine end vacuum within the evacuation chamber. Employing the described components, complete drawdown has been achieved within twenty to thirty seconds after opening vacuum valve 360, and with a resultant end vacuum within the evacuation chamber in excess of 29 inches of mercury.

Control of the above described evacuation and control of exposure are preferably provided at each of the respective printers 300 as schematically illustrated in FIG. 2. When a given printer 300 is to be operated to create a duplication, a start cycle switch 210 is depressed to activate vacuum delay timer 220 to produce a positive, or high, output. This positive output of vacuum delay timer 220 is sent as a signal along conductor 222 to one input of OR gate 230 which, in turn, sends an enabling signal which, when amplified, energizes vacuum valve 360 to connect vacuum line 440 through vacuum duct 190 to the source of fine vacuum formed within the vacuum holding tank 110. As previously described, within thirty seconds of this vacuum interconnection, the transparency and photosensitive material will be drawn into tight, contiguous relationship. Utilizing a safety factor of 2 to assure complete drawdown, a vacuum delay interval of sixty seconds is preset into vacuum delay timer 220 by vacuum delay adjustment 530. At the conclusion of this vacuum delay interval, vacuum delay timer 200 is deactivated and the output thereof goes low, disabling OR gate 230. The negative transient produced as the output of vacuum delay timer 220 goes low activates exposure timer 240, which senses this negative transient along conductor 226. The resultant positive output of activated exposure timer 240 is sent as a signal along conductor 242 to a second input of OR gate 230 to maintain the vacuum interconnection through vacuum valve 360. It will be apparent to those skilled in the art that vacuum valve 360 is not responsive to the extremely brief interval during which OR gate 230 is disabled as vacuum control switches from vacuum delay timer 220 to exposure timer 240. Accordingly, the vacuum developed during the predetermined delay interval remains continuously applied to the vacuum pan 430, and the photosensitive material and transparency remain intimately contacted.

The positive output of exposure timer 240 is also amplified (as discussed hereinafter) and sent along conductor 244 to energize the source of exposing radiation 324. The source of exposing radiation 324 is activated, and vacuum valve 360 remain enabled, during the time interval necessary for proper exposure of the photosensitive material. This exposure interval is variably controlled by the exposure duration network 540 contained in control box 500. At the expiration of this exposure interval, vacuum valve 360 closes and vents the vacuum drawn in vacuum pan 430 to the atmosphere permitting disengagement of cover 420 for retrieval of the work pieces.

As schematically illustrated in FIG. 2, cyclical functioning of the circuit is displayed by cycle on indicator 250 and cycle off indicator 260, both of which are light emitting diodes. Cycle off indicator 260 is activated by the output of first NOR gate 262. Since the inputs of first NOR gate 262 are the outputs of vacuum delay timer 220 and exposure timer 240, respectively, cycle off indicator 260 is activated during the periods when vacuum valve 360 is disabled. The output to first NOR gate 262 serves as the single input of second NOR gate 252 to functionally produce a logical OR output that operationally parallels the output of OR gate 230. Accordingly, cycle on indicator 250 is enabled during the time periods when vacuum valve 360 is enabled by OR gate 230.

Also provided is cycle interrupt switch 270, a momentary push-button, which may be activated by the operator during the predetermined vacuum delay interval, if it is desired to prevent exposure of the photosensitive material.

The purpose of those components included in FIG. 5 but not described herein will be apparent to those skilled in the art.

FIG. 5 shows a preferred circuit adapted to effect the control illustrated and discussed with reference to FIG. 2 above. Utilizing well known techniques, a twelve volt regulated power supply 510 is provided. Included within power supply 510 are transformer 512, bridge rectifier 514, voltage regulator 516, filters 517 and 518, and power switch 519. Connected as shown, timer 520, a type 556 integrated circuit forms the timing functions of vacuum delay timer 220 and exposure timer 240 as described in detail above with reference to FIG. 2. Vacuum delay adjustment 530 includes capacitor 532 and variable resistor 534. Resistor 534 is accessible through the face plate of control box 500 and is manually adjusted to preset the preferred delay interval of sixty seconds. Once so preset, no further operator assistance is required to achieve complete drawdown during repetitive duplication operations. Exposure duration network 540 includes variable decade resistors 542 and 544 for setting the desired time duration for exposure in intervals of one and ten seconds, respectively. Resistors 542 and 544 are connected to calibrated control knobs 546 and 548 respectively on the face plate of control box 500 (see FIG. 3). One output of timer 520 (which corresponds to the positive output of exposure timer 240 in FIG. 3) is amplified by exposure amplifier 550 to activate the source of exposing radiation 324, which is connected to the exposure light socket shown in FIG. 5. Included in the exposure amplifier are resistor 552, diodes 554, and power triac 556. Logic control 570, a type CD 4001, integrated circuit, as connected, supplies the logic functions described above for OR gate 230, and first and second NOR gates, 262 and 252, respectively. An output of logic control 570 (which corresponds to the output produced by OR gate 230 in FIG. 3) is fed to vacuum amplifier 560, which includes resistor 562, transistor switch 564, resistor 566 and power triac 568. Vacuum valve 360 is connected to the vacuum control socket shown in FIG. 5 and is activated by the amplified output produced by vacuum amplifier 568.

Cycle on indicator 250 and cycle off indicator 260 are connected, as shown, to logic control 570 through resistors 254 and 264 respectively.

The circuit of FIG. 5 is contained within control box 500, which is shown more clearly in FIG. 3. Located upon the face plate of control box 500 are power switch 519, start cycle switch 210, cycle interrupt switch 270, calibrated control knobs 546 and 548, cycle on indicator 250 and cycle off indicator 260. When the master vacuum system 100 has been activated to develop the desired vacuum in vacuum holding tank 110, the respective printers 300 are operated as follows. Power switch 519 is closed to energize the control circuitry. The photosensitive material and transparency are loaded into vacuum frame assembly 400, and cover 420 is lowered into engagement with vacuum pan 430. Calibrated control knobs 546 and 548 are adjusted to preset the time period during which a vacuum will be maintained within vacuum pan 430 and during which the source of exposing radiation 324 will be activated. Vacuum drawn-down and exposure are, then, automatically effected by depressing start-cycle switch 210. As discussed above, upon completion of exposure, the source of exposing radiation 324 is deactivated and the vacuum developed in vacuum pan 430 is automatically released through vacuum valve 360, permitting disengagement of cover 420 and retrieval of the exposed photosensitive material and transparency.

We claim:

1. In contact reproduction wherein a master transparency is duplicated onto a photosensitive material, apparatus in combination with plural vacuum contact printers, each having an evacuation chamber formed by a surface, for supporting the master transparency and photosensitive material, and a transparent cover coactively connected to said support surface to afford access into said chamber, and having a source of exposing radiation directed toward said transparent cover, said apparatus comprising:
   (A) a vacuum holding tank, the interior of which defines an exhaustible reservoir, the volume of said reservoir being significantly greater than the combined volumes of the evacuation chambers of said plural vacuum contact printers;
   (B) a high displacement vacuum pump operably connected to said vacuum holding tank to exhaust air from the interior thereof;

(C) a pressure control switch, coactively connected to the interior of said vacuum holding tank and to said vacuum pump, said pressure control switch having means responsive to the pressure level of the interior said vacuum holding tank whereby said vacuum pump may be selectively activated to evacuate the interior of said vacuum holding tank to form a source of fine vacuum;

(D) vacuum coupling means, operably connected to the respective evacuation chambers of each of said plural vacuum contact printers and to said source of fine vacuum, for selectively connecting said evacuation chambers to said source of fine vacuum to form a temporary fine vacuum in said evacuation chambers whereby said master transparency and photosensitive material are rapidly drawn into intimate contact;

(E) exposure control means operably connected to the respective sources of exposing radiation of each of said plural vacuum contact printers for selectively activating said sources of exposing radiation while said master transparency and photosensitive material are drawn into intimate contact.

2. Apparatus of claim 1, wherein said vacuum coupling means includes plural independently operable vacuum control means, corresponding in number to the number of said vacuum contact printers, separately connecting, in parallel, each of said evacuation chambers, to said source of fine vacuum, for independently controlling the selective formation of a temporary fine vacuum in each of said evacuation chambers.

3. Apparatus of claim 2, wherein each of said vacuum control means includes variable vacuum timing means for maintaining the connection of each of said evacuation chambers to said source of fine vacuum for variable predetermined vacuum delay intervals.

4. Apparatus of claim 3, wherein said exposure control means includes plural independently operable variable exposure timing means, corresponding in number to the number of said vacuum contact printers, one of said exposure timing means being connected to each of said sources of exposing radiation, respectively, for independently activating said sources of exposing radiation for variable predetermined exposure intervals.

5. Apparatus of claim 4, wherein said exposure timing means are coactively connected to said vacuum timing means, whereby each of said evacuation chambers remains operatively connected to said source of fine vacuum during said variable predetermined exposure intervals.

* * * * *